(12) United States Patent
Zennyoji

(10) Patent No.: US 8,715,433 B2
(45) Date of Patent: May 6, 2014

(54) METHOD FOR FABRICATING LIQUID CRYSTAL DISPLAY PANEL

(75) Inventor: Masahito Zennyoji, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 0 days.

(21) Appl. No.: 13/582,811

(22) PCT Filed: Mar. 3, 2011

(86) PCT No.: PCT/JP2011/001251
§ 371 (c)(1),
(2), (4) Date: Sep. 5, 2012

(87) PCT Pub. No.: WO2011/125284
PCT Pub. Date: Oct. 13, 2011

(65) Prior Publication Data
US 2012/0325392 A1    Dec. 27, 2012

(30) Foreign Application Priority Data
Apr. 6, 2010    (JP) ................................. 2010-087933

(51) Int. Cl.
*B32B 37/14*    (2006.01)
(52) U.S. Cl.
USPC ............. 156/60; 156/100; 156/101; 156/104; 156/107; 156/182; 156/247; 349/190
(58) Field of Classification Search
CPC .................................. G02F 1/1339; G09F 9/35
USPC ................. 156/60, 101, 104, 107, 182, 247; 349/190
See application file for complete search history.

(56) References Cited

U.S. PATENT DOCUMENTS

| | | | |
|---|---|---|---|
| 2007/0146598 A1* | 6/2007 | Yokokawa et al. | 349/123 |
| 2007/0206152 A1* | 9/2007 | Katsumura | 349/190 |
| 2009/0079922 A1* | 3/2009 | Tanaka | 349/123 |
| 2012/0044445 A1* | 2/2012 | Monma et al. | 349/123 |

FOREIGN PATENT DOCUMENTS

| | | |
|---|---|---|
| JP | 11-064862 A | 3/1999 |
| JP | 2002-365648 A | 12/2002 |
| JP | 2003-520995 A | 7/2003 |
| JP | 2007-025516 A | 2/2007 |

(Continued)

OTHER PUBLICATIONS

An International Search Report, dated Apr. 5, 2011, in International Application No. PCT/JP2011/001251.

*Primary Examiner* — Katarzyna Wyrozebski Lee
*Assistant Examiner* — Margaret Squalls
(74) *Attorney, Agent, or Firm* — Lowe Hauptman & Ham, LLP

(57) ABSTRACT

A method for fabricating a liquid crystal display panel includes a step where, on a first mother substrate having an alignment film formed thereon, a first sealing member is provided to surround a display area and overlap the alignment film, and a second sealing member is provided such that the second sealing member extends along at least a side of the first sealing member and is spaced from the alignment film; and a step where the first mother substrate having the first and second sealing members provided thereon and a second mother substrate having an alignment film formed thereon are attached to each other such that the first and second sealing members are united each other with their side edges being in contact with each other.

9 Claims, 7 Drawing Sheets

(56) References Cited

FOREIGN PATENT DOCUMENTS

| | | |
|---|---|---|
| JP | 2007-121691 A | 5/2007 |
| JP | 2007-233289 A | 9/2007 |
| JP | 2008-096836 A | 4/2008 |
| WO | 01/53886 A1 | 7/2001 |

* cited by examiner

FIG.5
(a)
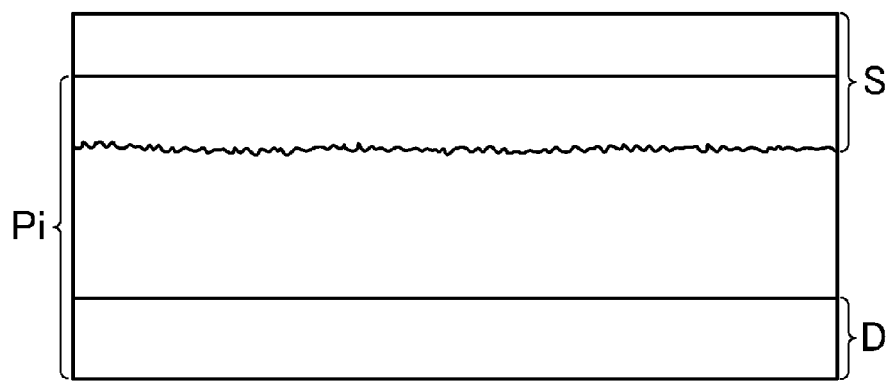
(b)
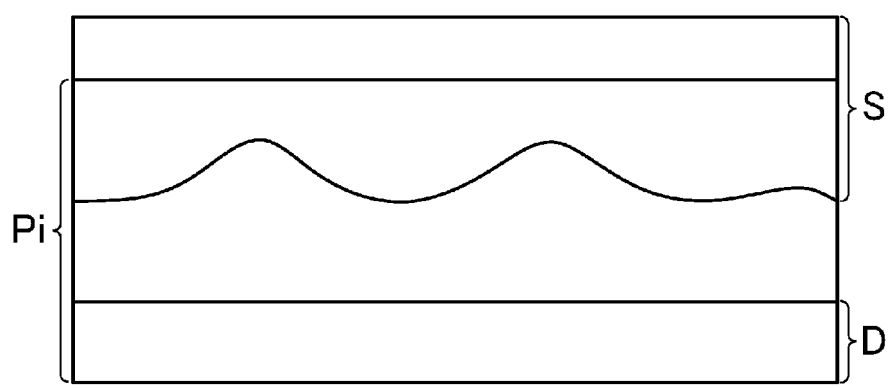

METHOD FOR FABRICATING LIQUID CRYSTAL DISPLAY PANEL

RELATED APPLICATIONS

The present application is based on International Application No. PCT/JP2011/001251, filed Mar. 3, 2011 and claims priority from, Japanese Application Number 2010-087933, filed Apr. 6, 2010.

TECHNICAL FIELD

The present disclosure relates to methods for fabricating liquid crystal display panels, and more particularly to a method for fabricating a liquid crystal display panel of a homeotropic alignment (vertical alignment) mode.

BACKGROUND ART

A liquid crystal display panel includes a thin film transistor (hereafter also referred to as a "TFT") substrate having, e.g., a TFT, a color filter (hereafter also referred to as a "CF") substrate located opposite to the TFT substrate and having, e.g., a CF, a liquid crystal layer provided between the TFT substrate and the CF substrate, alignment films each provided on a surface closer to the liquid crystal layer of each of the TFT substrate and the CF substrate, and a sealing member provided in a frame shape to bond the TFT substrate and the CF substrate together and to enclose the liquid crystal layer.

In recent years, there has been a constant demand for liquid crystal display panels for use in mobile devices such as cellular telephones to achieve picture-frame narrowing. Specifically, in order that the liquid crystal display panels have a large display area for displaying images, it is desired to decrease the width of a picture-frame area which surrounds the display area and includes, for example, the sealing member provided therein.

For example, Patent Document 1 describes a method for fabricating a liquid crystal display panel including a sealing member formation step in which a sealing member made of a single ingredient is formed in a shape completely surrounding an area where a liquid crystal layer is enclosed, a liquid crystal enclosing step in which a CF substrate and a TFT substrate are attached together with the liquid crystal layer being enclosed in the area surrounded by the sealing member, and an end face formation step in which at least part of an end face of the liquid crystal display panel is formed by cutting the CF substrate, the TFT substrate and the sealing member in an area where the sealing member is located. Patent Document 1 also describes that the above method enables fabrication of a liquid crystal display panel in which a distance between an actual liquid crystal display area and an end face of the liquid crystal display panel is reduced.

CITATION LIST

Patent Document

PATENT DOCUMENT 1: Japanese Patent Publication No. 2008-96836

SUMMARY OF THE INVENTION

Technical Problem

Meanwhile, since a liquid crystal display panel of a homeotropic alignment mode has a structure in which liquid crystal molecules constituting a liquid crystal layer are oriented substantially perpendicularly to a substrate face when no voltage is applied to the liquid crystal layer, the liquid crystal display device exhibits an excellent viewing angle characteristic in a black state. An alignment film used in this liquid crystal display panel of a homeotropic alignment mode has hydrophobicity higher than that of an alignment film for a homogeneous alignment mode, and therefore has low compatibility with a sealing member. Accordingly, especially in a liquid crystal display panel for a mobile device, when the picture-frame narrowing is intended by allowing a sealing member to overlap a peripheral edge portion of an alignment film, problems as described below can occur. Specifically, the sealing member can adversely be formed in a meandering line, not in a straight line, because the sealing member provided on the alignment film has low wettability, and is repelled on the alignment film. Further, if auto-aggregation of the sealing member causes a break in the sealing member, a leak of a liquid crystal material from the panel or intrusion of air into the panel can occur and thereby can cause a display defect in the fabricated liquid crystal display panel.

It is therefore an object of the present disclosure to form a sealing member in a predetermined shape at a predetermined position even when the sealing member overlaps an alignment film.

Solution to the Problem

To achieve the object, according to the present disclosure, a second sealing member which is provided outward relative to a first sealing member in a frame shape, which overlaps an alignment film to enclose a liquid crystal layer, such that the second sealing member is spaced from the alignment film and the first and second sealing members come into contact with each other by attaching mother substrates to each other.

Specifically, the present disclosure provides a method for fabricating a liquid crystal display panel including a first substrate and a second substrate provided opposite to each other, a liquid crystal layer provided between the first and second substrates, alignment films formed respectively on a surface of the first substrate facing the liquid crystal layer and a surface of the second substrate facing the liquid crystal layer, and a sealing member bonding the first and second substrates to each other and enclosing the liquid crystal layer between the first and second substrates, wherein a display area for displaying an image is defined inside the sealing member. The method of the present disclosure includes: an alignment film formation step in which one of the alignment films is formed on a first mother substrate including the first substrate in such a manner that the alignment film covers the display area of the first substrate, and the other alignment film is formed on a second mother substrate including the second substrate in such a manner that the alignment film covers the display area of the second substrate; a sealing member formation step in which, on the first mother substrate having the alignment film formed thereon, a first sealing member in a frame shape is provided in such a manner that the first sealing member surrounds the display area and overlaps the alignment film, and a second sealing member is provided in such a manner that the second sealing member extends along at least a side of the first sealing member and is spaced from the alignment film; a substrate attachment step in which the first mother substrate having the first and second sealing members provided thereon and the second mother substrate having the alignment film formed thereon are attached to each other with the first and second sealing members interposed therebetween in such a manner that the display areas of the mother substrates overlap each other, and the first and second sealing members are united in such a manner that side edges of the sealing members come into contact with each other; and a breaking step in which the sealing member is formed by breaking the first and second mother substrates attached to each other along an intermediate portion of a width of the united first and second sealing members, and the first and second mother substrates attached to each other are divided into the first and second substrates.

According to the above method, in the sealing member formation step, the second sealing member is provided to be spaced from the alignment film which has been formed on the first mother substrate in the alignment film formation step. Accordingly, the second sealing member is formed in a predetermined shape at a predetermined position on the first mother substrate. In addition, although the first sealing member, which overlaps the alignment film, may not be formed in a predetermined shape at a predetermined position on the alignment film of the first mother substrate, the second sealing member formed in the predetermined shape at the predetermined position and located outward relative to the first sealing member provides the following advantage. Specifically, even if the first sealing member which is interposed between the first and second mother substrates is repelled by the alignment film and strays from the film to spread outwardly in the substrate attachment step, an outer side edge of the first sealing member come into contact with and is blocked by a side edge of the second sealing member (which is formed in the predetermined shape at the predetermined position), thereby reducing excessive spreading of the first sealing member. Consequently, the first sealing member is formed and located corresponding to the position and shape of the second sealing member, resulting in that the first sealing member is formed in the predetermined shape at the predetermined position on the alignment film. Further, in the breaking step, the first and second mother substrates attached to each other are broken along an intermediate portion of the united first and second sealing members. As a result, the sealing member which is composed principally of the first sealing member and encloses the liquid crystal layer is formed to have a sufficient width between the first and second substrates. Excessive portion of the sealing member which is composed principally of the second sealing member is removed together with excessive portions of the first and second mother substrates. In the liquid crystal display panel fabricated through the above steps, since the sealing member interposed between the first and second substrates is composed principally of the first sealing member (which is formed in the predetermined shape at the predetermined position on the alignment film), the sealing member is formed in the predetermined shape at the predetermined position despite of the structure in which the sealing member overlaps the alignment film.

The first substrate may include a plurality of first substrates which are arranged in a matrix on the first mother substrate, and the second substrate may include a plurality of second substrates which are arranged in a matrix on the second mother substrate.

According to the above method, in which the first substrate includes a plurality of first substrates arranged in a matrix on the first mother substrate and the second substrate includes a plurality of second substrates arranged in a matrix on the second mother substrate, a plurality of liquid crystal display panels can be specifically fabricated by gang printing.

In the sealing member formation step, the second sealing members may be provided in such a manner that a pair of display areas adjacent to each other on the first mother substrate share an associated one of the second sealing members.

In application of the above method to a method for fabricating a plurality of liquid crystal display panels by gang printing, since a pair of the display areas adjacent to each other share an associated one of the second sealing members, the number of the second sealing members required per production unit is reduced. Accordingly, costs for materials for the sealing members decrease, and time required for forming the sealing members also decreases if a dispenser is used for forming the sealing members.

In the substrate attachment step, the liquid crystal layer may be enclosed inside the first sealing member.

According to the above method, since the liquid crystal layer is enclosed inside the first sealing member interposed between the first and second mother substrates in the substrate attachment step, a liquid crystal display panel is specifically fabricated with a one drop filling (ODF) method.

In the alignment film formation step, a homeotropic alignment film may be formed on each of the first and second mother substrate.

According to the above method, since the alignment films formed on the first and second mother substrates are homeotropic alignment films, the first sealing member is not likely to be formed in a predetermine shape at a predetermine position on the alignment film of the first mother substrate. Therefore, the advantages of the present disclosure are effectively obtained.

Advantages of the Invention

According to the present disclosure, the first sealing member in a frame shape overlaps the alignment film to enclose the liquid crystal layer whereas the second sealing member is formed to be spaced from the alignment film and located outward relative to the first sealing member in such a manner that the sealing members come into contact with each other by attaching the mother substrates to each other. Consequently, the sealing member can be formed in a predetermined shape at a predetermined position despite of the structure in which the sealing member overlaps the alignment film.

BRIEF DESCRIPTION OF THE DRAWINGS

FIG. 5 shows plan views each illustrating a state of sealing member of a liquid crystal display panel fabricated as an example according to the first embodiment and a state of sealing member of a liquid crystal display panel fabricated as a comparative example.

DESCRIPTION OF EMBODIMENTS

Embodiments of the present disclosure will be described in detail with reference to the drawings. Note that the disclosure is not limited by each of the embodiments described below.

First Embodiment

Figure 1:
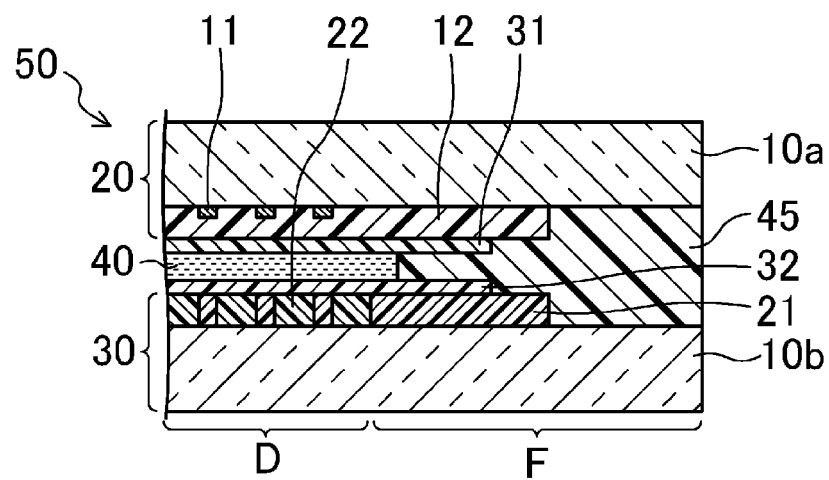
FIG. 1 is a cross-sectional view of a liquid crystal display panel according to a first embodiment.

FIGS. 1-5 show a first embodiment of a method for fabricating a liquid crystal display panel according to the present disclosure. Specifically, FIG. 1 is a cross-sectional view of a liquid crystal display panel 50 of this embodiment.

As shown in FIG. 1, the liquid crystal display panel 50 includes a TFT substrate 20 (a second substrate) and a CF substrate 30 (a first substrate) which are provided opposite to each other, and also includes a liquid crystal layer 40 provided between the TFT substrate 20 and the CF substrate 30, homeotropic alignment films 31 and 32 provided on a surface of the TFT substrate 20 facing the liquid crystal layer 40 and a surface of the CF substrate 30 facing the liquid crystal layer 40, respectively, and a sealing member 45 provided in a frame shape to bond the TFT substrate 20 and the CF substrate 30 together and to enclose the liquid crystal layer 40 between the TFT substrate 20 and the CF substrate 30. In addition, as shown in FIG. 1, a display area D having a rectangular shape and displaying images and a picture-frame area F having a frame shape and surrounding the display area D are defined in the liquid crystal display panel 50.

As shown in FIG. 1, the TFT substrate 20 includes, in the display area D, a plurality of gate lines (not shown) extending in parallel to each other on an insulating substrate 10a, a plurality of source lines 11 extending in parallel to each other in a direction perpendicular to the gate lines, a plurality of TFTs (not shown) each provided at an associated one of intersections of the gate lines and the source lines 11, i.e., in a pixel which is the smallest unit of an image, an interlayer insulating film 12 covering the TFTs, and a plurality of pixel electrodes (not shown) arranged in a matrix on the interlayer insulating film 12.

As shown in FIG. 1, the CF substrate 30 includes a black matrix 21 with a grid pattern provided on an insulating substrate 10b, a plurality of color layers 22, such as a red layer, a green layer, and a blue layer, each of which is provided between grid bars of the black matrix 21, and a common electrode (not shown) covering the black matrix 21 and the color layers 22.

The liquid crystal layer 40 is made of, for example, a nematic liquid crystal material having electro-optic properties, and includes liquid crystal molecules whose dielectric anisotropy is negative ($\Delta\epsilon<0$).

The homeotropic alignment films 31 and 32 are made of, for example, a polyimide resin having an alkyl group side chain or a fluorine-containing group side chain.

The liquid crystal display panel 50 having the structure as described above displays an image in the following manner: a predetermined voltage is applied pixel by pixel to the liquid crystal layer 40 provided between the pixel electrodes on the TFT substrate 20 and the common electrode on the CF substrate 30 to change the orientation of the liquid crystal layer 40, and as a result, transmittance of light passing through the panel is adjusted pixel by pixel. The liquid crystal display panel 50 is in a homeotropic alignment mode. The liquid crystal display panel 50 has a structure in which liquid crystal molecules constituting the liquid crystal layer are oriented substantially perpendicularly to a substrate face when no voltage is applied to the liquid crystal layer 40, and the liquid crystal molecules are oriented substantially parallel to the substrate face when a voltage is applied to the liquid crystal layer 40.

Figure 2:
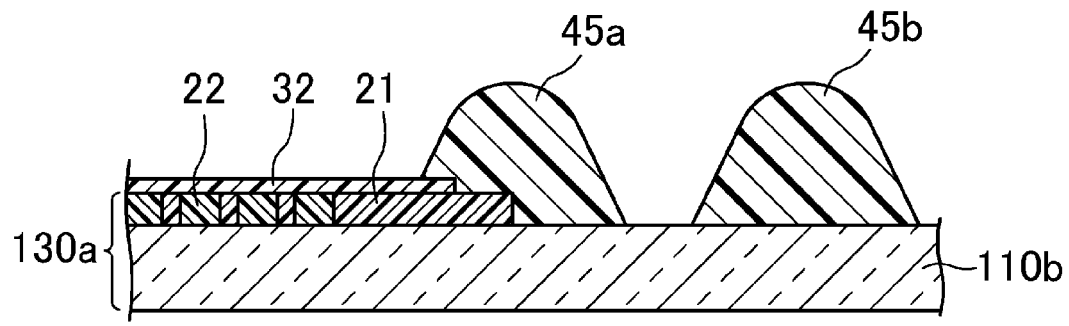
FIG. 2 is a cross-sectional view showing a sealing member formation step of a method for fabricating a liquid crystal display panel according to the first embodiment.
Figure 3:
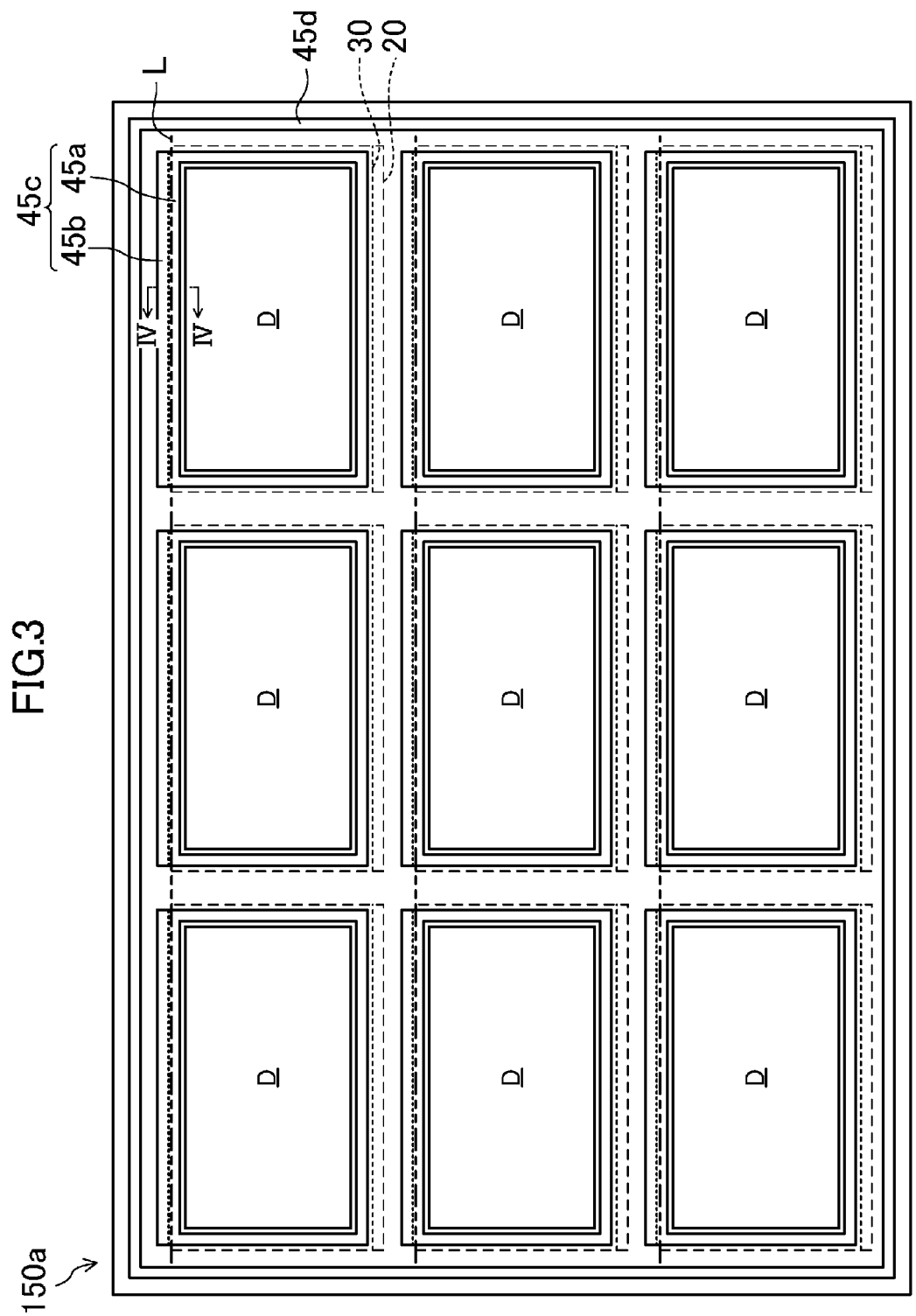
FIG. 3 is a plan view showing a substrate attachment step of the method for fabricating a liquid crystal display panel according to the first embodiment.
Figure 4:
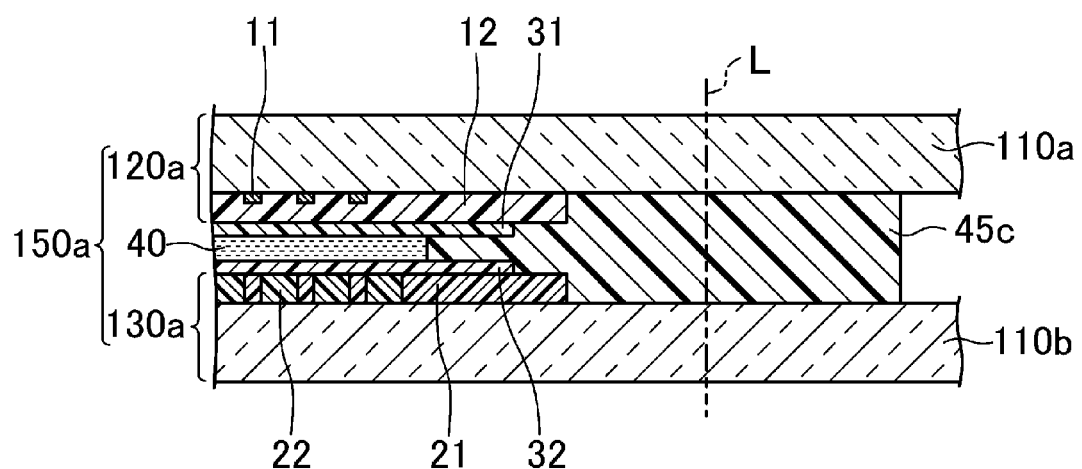
FIG. 4 is a cross-sectional view of the substrate attachment step taken along the line IV-IV in FIG. 3.

Next, a fabrication method of the liquid crystal display panel 50 is described with reference to FIGS. 2, 3 and 4. FIG. 2 is a cross-sectional view showing a sealing member formation step of the fabrication method of the liquid crystal display panel 50. FIG. 3 is a plan view showing a substrate attachment step of the fabrication method of the liquid crystal display panel 50. FIG. 4 is a cross-sectional view of the substrate attachment step taken along the line IV-IV in FIG. 3. Note that the fabrication method of this embodiment includes a mother substrate producing step, an alignment film formation step, the sealing member formation step, the substrate attachment step, and a breaking step.

<Mother Substrate Producing Step>

For example, the gate lines, the source lines 11, the TFTs, the interlayer insulating film 12, the pixel electrodes, and other components are formed unit-cell by unit-cell on a mother glass substrate 110a having a thickness of about 0.7 mm by using a well-known method, thereby producing a TFT mother substrate (second mother substrate) 120a (see FIG. 4) including a plurality of the TFT substrates (second regions) 20 arranged in a matrix and each having the display area D defined therein.

For example, the black matrix 21, the color layers 22, the common electrode, and other components are formed unit-cell by unit-cell on a mother glass substrate 110b having a thickness of about 0.7 mm by using a well-known method, thereby producing a CF mother substrate (first mother substrate) 130a (see FIGS. 2 and 4) including a plurality of the CF substrates (first regions) 30 arranged in a matrix and each having the display area D defined therein.

<Alignment Film Formation Step>

The above described polyimide resin is applied by using a printing method on a surface of each of the TFT mother substrate 120a and the CF mother substrate 130a produced in the mother substrate producing step, and the resultant applied films are subjected to baking. In consequence, the homeotropic alignment films 31 and 32 (each with a thickness of about 100 nm) covering each display area D are formed on the TFT mother substrate 120a and the CF mother substrate 130a, respectively.

<Sealing Member Formation Step>

For example, an epoxy resin is applied by using a dispenser on the CF mother substrate 130a on which the homeotropic alignment film 32 has been formed in the alignment film formation step. Specifically, as shown in FIG. 2, first sealing members 45a each having a frame shape are each formed in the picture-frame area F surrounding an associated one of the display areas D in such a manner that the first sealing member 45a overlaps the peripheral edge portion of the homeotropic alignment film 32. In addition, second sealing members 45b each having a linear shape are formed to be spaced from the homeotropic alignment film 32 and each extends along a side of an associated one of the first sealing members 45a. Further, a peripheral sealing member 45d (see FIG. 3) is formed to surround the first sealing members 45a and the second sealing members 45b.

<Substrate Attachment Step>

First, for example, a liquid crystal material is dropped on each of the areas (i.e. the display areas D) surrounded by the first sealing members 45a of the CF mother substrate 130a on which the first sealing members 45a, the second sealing members 45b, and the peripheral sealing member 45d have been provided in the sealing member formation step.

Next, the CF mother substrate 130a having the liquid crystal material dropped thereon and the TFT mother substrate 120a on which the homeotropic alignment film 31 has been formed in the alignment film formation step are attached to each other under a reduced pressure in such a manner that the display areas D of the mother substrates overlap each other. The TFT mother substrate 120a and the CF mother substrate 130a are thereafter exposed to the atmosphere so that a pressure is applied to the outer surfaces of the mother substrates, thereby producing a two-substrate structure 150a as shown in FIGS. 3 and 4.

The first and second sealing members 45a and 45b in each unit cell unite with each other to form a sealing member 45c which is interposed between the TFT mother substrate 120a and the CF mother substrate 130a constituting the two-substrate structure 150a. The sealing member 45c and the peripheral sealing member 45d are cured, and then the mother glass substrates 110a and 110b are thinned by a chemical polishing treatment (a chemical etching treatment) so that the thickness of each substrate decreases to about 0.05-0.3 mm, for example.

<Breaking Step>

First, for example, a disc-like cutting blade is rolled along the peripheries of the sealing members 45c, with the blade tip of the cutting blade being in contact with the outer surface of the TFT mother substrate 120a constituting the two-substrate structure 150a which have been thinned in the substrate attachment step. This operation causes a linear crack and develops the crack in the substrate thickness direction, thereby breaking the TFT mother substrate 120a unit-cell by unit-cell and dividing the same into the TFT substrates 20. Here, as shown in FIG. 3, in the sealing members 45c, on the sides where the first and second sealing members 45a and 45b are united each other, the cutting blade is rolled with the blade tip being contact with an intermediate portion in the width of the sealing members, resulting in that the TFT mother substrate 120z is broken along breaking lines L extending on the sealing members 45c. Note that the cutting blade has the blade tip made of, e.g., a superhard alloy such as tungsten carbide or a sintered diamond. The "intermediate portion" in the width of the sealing members means an arbitrarily portion between the edges in the width direction of the sealing member, and is not limited to the middle between the edges in the width direction of the sealing member.

Next, after the two-substrate structure 150a with the TFT mother substrate 120a broken is overturned, the CF mother substrate 130a is broken in a manner similar to that of the TFT mother substrate 120a. Specifically, the cutting blade is rolled along the peripheries of the sealing members 45c, with the blade tip of the cutting blade being in contact with the outer surface of the CF mother substrate 130a. This operation causes a linear crack and develops the crack in the substrate thickness direction, thereby breaking the CF mother substrate 130a unit-cell by unit-cell and dividing the same into the CF substrates 30. In this step, the sealing member 45c is cut at the same time as breaking of the CF mother substrate 130a and allowed to serve as a sealing member 45, thereby dividing the two-substrate structure 150a into unit cells.

The liquid crystal display panel 50 of this embodiment can be fabricated in the above described manner.

Experiments specifically conducted are now described with reference to FIG. 5. FIG. 5(a) is a plan view showing a state of sealing members of a liquid crystal display panel fabricated as an example according to this embodiment. FIG. 5(b) is a plan view showing a state of sealing members of a liquid crystal display panel fabricated as a comparative example of this embodiment.

First, a liquid crystal display panel as the example of this embodiment was fabricated by the same method as described above. As the comparative example of this embodiment, a liquid crystal display panel was fabricated by the same method as the above, except that the second sealing member was omitted from the sealing member formation step.

It was confirmed that, in the liquid crystal display panel of the example, as shown in FIG. 5(a), a side edge of a sealing member S was formed nearly in a liner shape although the sealing member S overlapped an edge portion of an alignment film Pi covering a display area D. It was also confirmed that, in the liquid crystal display panel of the comparative example, as shown in FIG. 5(b), a side edge of a sealing member S was formed in a meandering shape in a region where the sealing member S overlapped an alignment film Pi.

Further, in order to examine the relation among the distance between the first and second sealing members, adhesion between of the first and second sealing members, and a cell gap, liquid crystal display panels having different distances (0.65-0.85 mm) between the first and second sealing members were fabricated by the same method as described above. The fabricated liquid crystal display panels were evaluated for the adhesion between the sealing members and the cell gap.

Table 1 below shows experimental conditions of the distance between the first and second sealing members (the sealing member distance), and evaluation results of the adhesion between the first and second sealing members (the sealing member adhesion) and the cell gap. Here, a sealing material made of an UV-curable and thermosetting acrylic/epoxy resin including spacers having a particle size of about 3.7 μm was applied to form the first and second sealing members, and the resultant first and second sealing members had a width of about 0.2 mm and a height of about 0.03 mm Note that the sealing member distance refers to a distance between the middle of the first sealing member and the middle of the second sealing member. The widths of the first and second sealing members increased to about 0.8 mm after the substrate attachment step was completed.

TABLE 1

| Sealing member distance | Sealing member adhesion | Cell gap |
| --- | --- | --- |
| 0.65 mm | Good | Not uniform |
| 0.70 mm | Good | Uniform |
| 0.75 mm | Good | Uniform |
| 0.80 mm | Good | Uniform |
| 0.85 mm | Poor | Uniform |

As shown in Table 1, at the sealing member distances of 0.70 mm, 0.75 mm and 0.80 mm, the sealing member adhesion was good and the cell gaps were uniform, i.e., the advantages of the present disclosure were obtained. At the sealing member distance of 0.65 mm, the advantages of the present disclosure were not obtained. Specifically, the sealing member adhesion was good whereas the cell gap in the region where the sealing members were formed was disadvantageously larger than the cell gap of regions around the sealing members. Further, at the sealing member distance of 0.85 mm, the advantages of the present disclosure were not obtained. Specifically, the cell gap was uniform whereas the sealing member adhesion was poor and a clearance remained between the first and second sealing members.

As described above, according to the method for fabricating the liquid crystal display panel 50 of this embodiment, in the sealing member formation step, the second sealing members 45b are formed to be spaced from the homeotropic alignment film 32 which has been formed on the CF mother substrate 130a in the alignment film formation step. Accordingly, the second sealing members 45b are formed in a predetermined shape at a predetermined position on the CF mother substrate 130a. In addition, although the first sealing members 45a, which overlap the homeotropic alignment film 32, may not be formed in a predetermined shape at a predetermined position on the homeotropic alignment film 32 of the CF mother substrate 130a, the second sealing members 45b formed in the predetermined shape at the predetermined position and located outward relative to the first sealing members 45a provide the following advantage. Specifically, even if the first sealing members 45a which are interposed between the TFT mother substrate 120a and the CF mother substrate 130a are repelled by the homeotropic alignment films 31 and 32 and stray from the films to spread outwardly in the substrate attachment step, an outer side edge of each of the first sealing members 45a comes into contact with and is blocked by a side edge of an associated one of the second sealing members 45b (which are formed in the predetermined shape at the predetermined position), thereby enabling reduction of excessive spreading of the first sealing members 45a. Consequently, the first sealing members 45a are formed and located corresponding to the position and shape of the second sealing members 45b, resulting in that the first sealing members 45a can be formed in the predetermined shape at predetermined position on the homeotropic alignment film 32. Further, in the breaking step, the TFT mother substrate 120a and the CF mother substrate 130a attached to each other are broken along the intermediate portions of the sealing members where the first and second sealing members 45a and 45b are united, i.e., at the intermediate portions of the widths of the sealing members 45c. As a result, the sealing member 45 which is composed principally of the first sealing member 45a and encloses the liquid crystal layer 40 are formed to have a sufficient width between the TFT substrate 20 and the CF substrate 30. Excessive portions of the sealing members which are composed principally of the second sealing members 45b are removed together with excessive portions of the TFT mother substrate 120a and the CF mother substrate 130a. In the liquid crystal display panel 50 fabricated through the above steps, since the sealing member 45 interposed between the TFT substrate 20 and the CF substrate 30 is composed principally of the first sealing member 45a (which is formed in the predetermined shape at the predetermined position on the alignment film), the sealing member 45 can be formed in the predetermined shape at the predetermined position despite of the structure in which the sealing member 45 overlaps the homeotropic alignment films 31 and 32. In addition, the homeotropic alignment films 31 and 32 and the sealing member 45 suitably coincide with one another, and therefore, the picture-frame narrowing can be achieved in the liquid crystal display panel 50.

Each of the TFT substrates 20 has a terminal region which is located outward relative to the sealing member 45c, protrudes beyond the CF substrate 30, and includes an arrangement of terminals of lines for display such as the gate lines and the source lines 11. According to the fabricating method of the liquid crystal display panel 50 of this embodiment, although the terminals might suffer corrosion during the chemical polishing treatment, the terminal region is not likely to be exposed to outside during the chemical polishing treatment due to the peripheral sealing member 45d surrounding the sealing members 45c, and occurrence of the corrosion of the terminals caused by the chemical polishing treatment is reduced.

Second Embodiment

Figure 6:
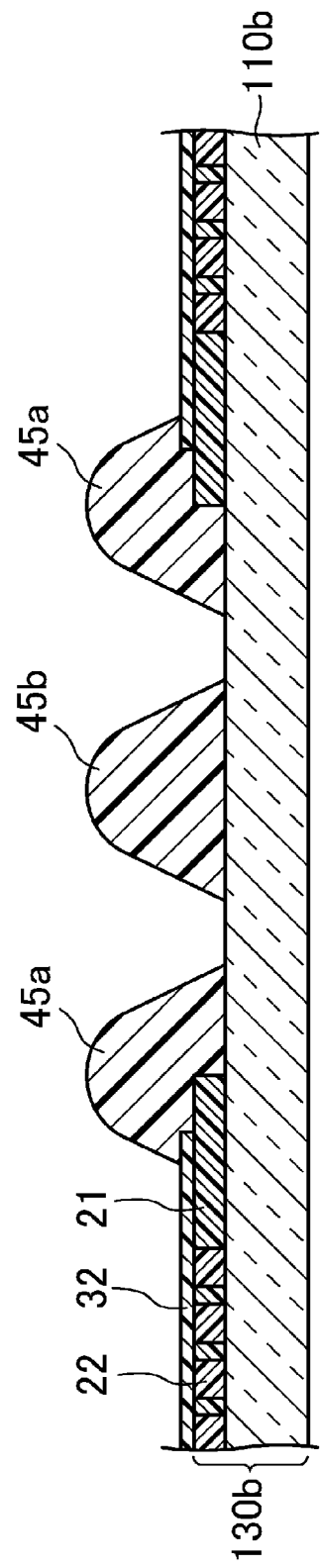
FIG. 6 is a cross-sectional view showing a sealing member formation step of a method for fabricating a liquid crystal display panel according to a second embodiment.
Figure 7:
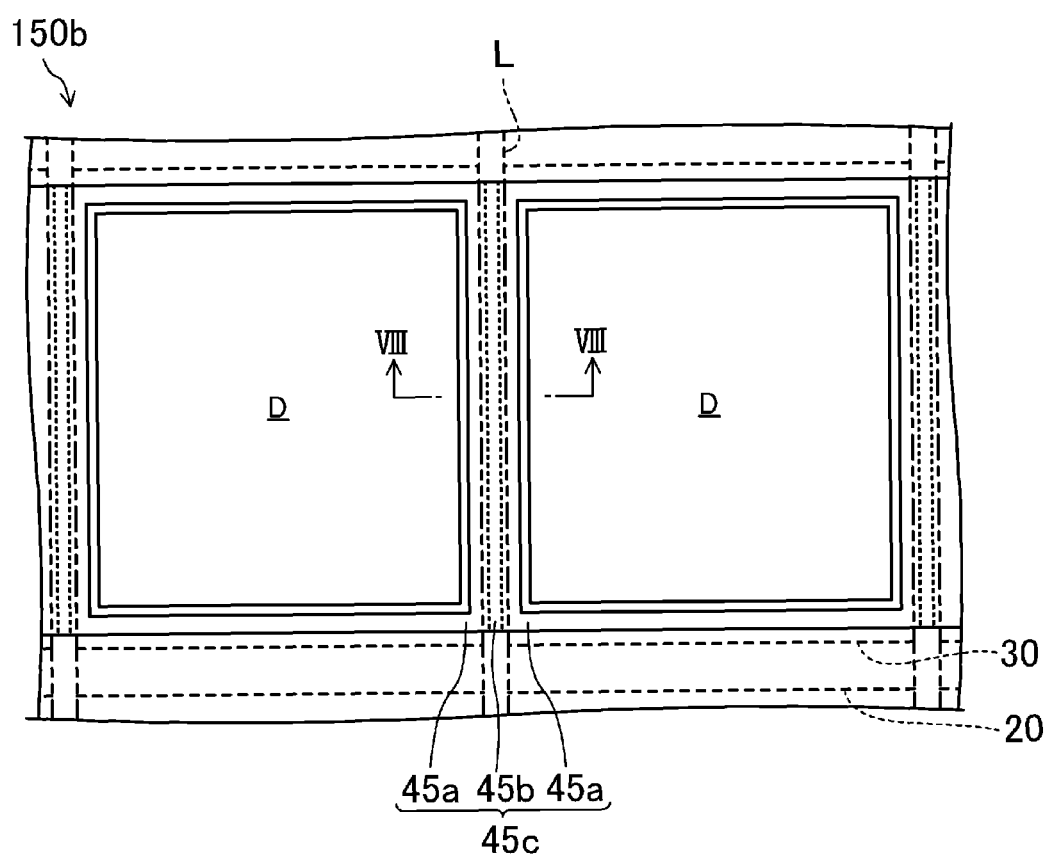
FIG. 7 is a plan view showing a substrate attachment step of the method for fabricating a liquid crystal display panel according to the second embodiment.
Figure 8:
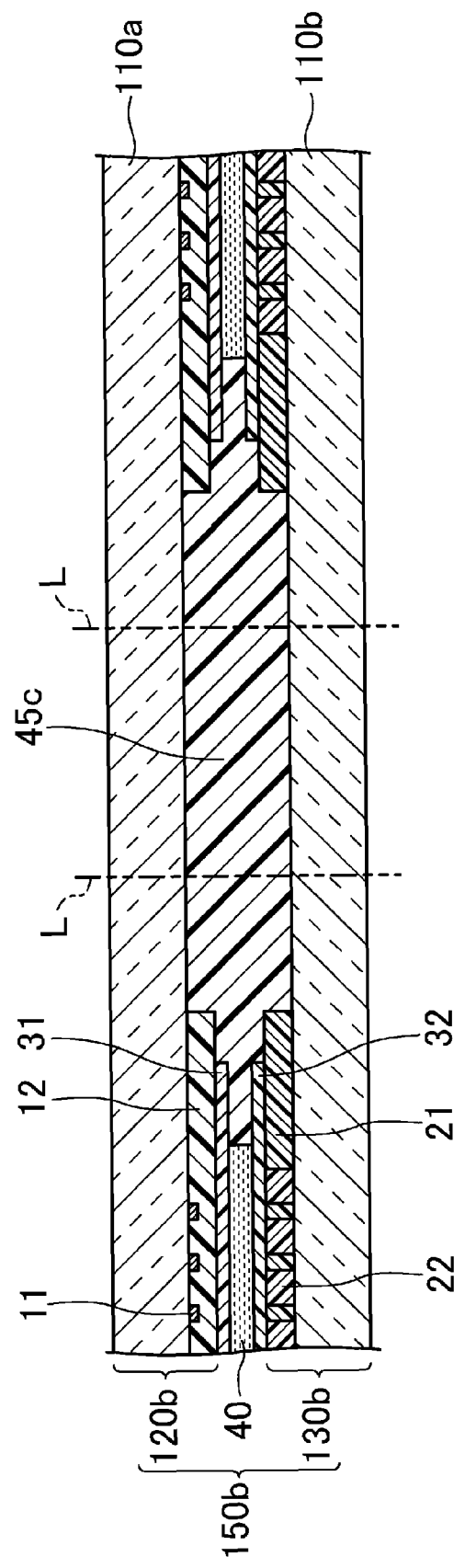
FIG. 8 is a cross-sectional view of the substrate attachment step taken along the line VIII-VIII in FIG. 7.

FIGS. 6-8 show a method for fabricating liquid crystal display panels according a second embodiment of the present disclosure. Specifically, FIG. 6 is a cross-sectional view showing a sealing member formation step of the method for fabricating liquid crystal display panels of this embodiment. FIG. 7 is a plan view showing a substrate attachment step of the method for fabricating liquid crystal display panels of this embodiment. FIG. 8 is a cross-sectional view of the substrate attachment step taken along the line VIII-VIII in FIG. 7. In the embodiment described below, the same components as those in FIGS. 1-5 are denoted by the same reference characters, and detailed description thereof will not repeated.

The first embodiment exemplifies the method for fabricating liquid crystal display panels using the two-substrate structure 150a in which the second sealing members 45b are formed unit-cell by unit-cell. The second embodiment, on the other hand, exemplifies a method for fabricating liquid crystal display panels using a two-substrate structure 150b in which each pair of unit cells adjacent to each other share a second sealing member 45b.

In the liquid crystal display panel 50 of the first embodiment, the end faces of the TFT substrate 20, the CF substrate 30, and the sealing member 45 coincide at a side. In the liquid crystal display panel of this embodiment, the end faces of the TFT substrate (20), the CF substrate (30), and the sealing member (45) coincide at sides facing each other. Note that the structure of the liquid crystal display panel of this embodiment is substantially the same as that of the liquid crystal display panel 50 of the first embodiment except for the positions and the number of the sides on which the above-mentioned end faces coincide.

The liquid crystal display panel of this embodiment is fabricated through the steps described below. In the mother substrate producing step of the method as described in the first embodiment, a TFT mother substrate 120b (see FIG. 8) is produced such that the TFT substrates 20 adjacent to one another in the row direction or in the column direction are arranged at short intervals on the TFT mother substrate 120b, and in the same manner, a CF mother substrate 130b (see FIG. 8) is produced such that the CF substrates 30 adjacent to one another in the row direction or in the column direction are arranged at small intervals on the CF mother substrate 130b. Referring to FIG. 6 showing the sealing member formation step, on the CF mother substrate 130b on which a homeotropic alignment film 32 has been formed, first sealing members 45a each having a frame shape are each formed in the picture-frame area F surrounding an associated one of display areas D in such a manner that the first sealing members 45a overlap the peripheral edge portion of the homeotropic alignment film 32. In addition, second sealing members 45b each having a linear shape are formed to be spaced from the homeotropic alignment film 32 and each extends between a pair of the first sealing members 45a adjacent to each other and along a side of each of the first sealing members 45a consisting the pair. In the breaking step, on the two-substrate structure 150b, a cutting blade is rolled on a side of each sealing member 45c where a pair of the first sealing members 45a and the second sealing member 45b sandwiched between the pair are united, with the blade tip being in contact with two intermediate portions in the width of the side where the first and second sealing members 45a and 45b are united, as shown in FIGS. 7 and 8, resulting in that the TFT mother substrate 120b and the CF mother substrate 130b are broken along two braking lines L extending on the sealing members 45c, and the two-substrate structure 150b is divided into unit cells.

As described above, according to the method for fabricating a liquid crystal display panel of this embodiment, the first sealing members 45a each in a frame shape enclose the liquid crystal layer 40 and overlap the homeotropic alignment films 31 and 32 whereas the second sealing members 45b are formed to be spaced from the homeotropic alignment films 31 and 32 and located outward relative to an associated one of the first sealing members 45a in such a manner that the second sealing members 45b comes into contact with the first sealing members 45a by attaching the TFT mother substrate 120b and the CF mother substrate 130b to each other. Consequently, the sealing members 45 can be formed in a predetermined shape at a predetermined position despite of the structure in which the sealing members 45 overlap the homeotropic alignment films 31 and 32. In addition, since a pair of the display areas D adjacent to each other share an associated one of the second sealing members 45b, it is possible to reduce the number of the second sealing members 45b which are necessary per production unit, costs for materials for the sealing members (45), and time required for forming the sealing members (45).

Although the above embodiments exemplify the methods for fabricating liquid a crystal display panel in which the sealing members are formed on the CF mother substrate, the present disclosure is also applicable to a method for a fabricating liquid crystal display panel in which the sealing members are formed on a TFT mother substrate.

Although the above embodiments exemplify the methods for fabricating a liquid crystal display panel with gang printing, the present disclosure is also applicable to a method for fabricating a liquid crystal display panel singly.

In addition, although the above embodiments exemplify the methods for fabricating a liquid crystal display panel of a homeotropic alignment mode, the present disclosure is applicable to a method for a fabricating liquid crystal display panel in a homogeneous alignment mode.

Although a one drop filling (ODF) method is used in the methods for fabricating a liquid crystal display panel exemplified in the above embodiments, the present disclosure is applicable to a method for fabricating liquid a crystal display panel employing a liquid crystal vacuum injection method by which a liquid crystal material is injected into a space between substrates of an unfilled cell produced under a normal pressure.

Although the above embodiments exemplify active-matrix type liquid crystal display panels, the present disclosure is also applicable to passive-matrix type liquid crystal display panels.

INDUSTRIAL APPLICABILITY

As described above, according the present disclosure, sealing members can be formed in a predetermined shape at a predetermined position despite the structure in which the sealing members overlap an alignment film. Therefore, the present disclosure is useful for liquid crystal display panels for use in mobile devices in which picture-frame narrowing is desired.

| DESCRIPTION OF REFERENCE CHARACTERS | |
|---|---|
| D | Display area |
| 20 | TFT substrate (Second substrate) |
| 30 | CF substrate (First substrate) |
| 31 | Homeotropic alignment film |
| 32 | Homeotropic alignment film |
| 40 | Liquid crystal layer |
| 45 | Sealing member |
| 45a | First sealing member |
| 45b | Second sealing member |
| 50 | Liquid crystal display panel |
| 120a, 120b | TFT mother substrate (Second mother substrate) |
| 130a, 130b | CF mother substrate (First mother substrate) |

The invention claimed is:

1. A method of fabricating a liquid crystal display (LCD) panel, the method comprising:
    forming a first alignment film over a first region of a first mother substrate, the first region having a display area, the first alignment film covering the display area of the first region;
    forming a second alignment film over a second region of a second mother substrate, the second region having a display area, the second alignment film covering the display area of the second region;
    forming a first sealing member over the first mother substrate, the first sealing member surrounding the display area of the first region and overlapping the first alignment film;
    forming a second sealing member over the first mother substrate, the second sealing member extending along at least one side of the first sealing member while being separate from the first sealing member and without overlapping the first alignment film;
    after forming the first and second sealing members, bonding the first and second mother substrates into an united panel with the first and second sealing members interposed between the first and second mother substrates, wherein, in the united panel, the display areas of the first and second mother substrates overlap each other and the first and second sealing members are united into an united sealing member; and
    breaking the united panel along a breaking line extending in an intermediate portion of the united sealing member to obtain an LCD panel.

2. The method of claim 1, wherein
    the first mother substrate comprises a plurality of first regions arranged in a matrix on the first mother substrate, and
    the second mother substrate comprises a plurality of second regions arranged in a matrix on the second mother substrate.

3. The method of claim 2, wherein the second sealing member is common to a pair of display areas adjacent to each other on the first mother substrate.

4. The method of claim 1, further comprising:
    forming a liquid crystal layer over the display area surrounded by the first sealing member before bonding the first and second mother substrates.

5. The method of claim 1, wherein
    at least one of the first and second alignment films comprises a homeotropic alignment film.

6. The method of claim 1, wherein said breaking comprises mechanical cutting.

7. The method of claim 1, wherein the first sealing member completely surrounds the display area of the first region.

8. The method of claim 1, wherein the first sealing member overlaps an edge of the first alignment film.

9. The method of claim 2, wherein
the second sealing member is formed between a pair of first sealing members adjacent to each other on the first mother substrate, and
the united sealing member comprises the second sealing member and the pair of first sealing members united together.

* * * * *